United States Patent
Kumon

(10) Patent No.: US 11,698,265 B2
(45) Date of Patent: *Jul. 11, 2023

(54) VEHICLE DISPLAY DEVICE

(71) Applicant: TOYOTA JIDOSHA KABUSHIKI KAISHA, Toyota (JP)

(72) Inventor: Hitoshi Kumon, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

This patent is subject to a terminal disclaimer.

(21) Appl. No.: 17/301,721

(22) Filed: Apr. 12, 2021

(65) Prior Publication Data

US 2021/0231452 A1 Jul. 29, 2021

Related U.S. Application Data

(63) Continuation of application No. 16/831,230, filed on Mar. 26, 2020, now Pat. No. 11,002,560.

(30) Foreign Application Priority Data

Mar. 28, 2019 (JP) ................................. 2019-064664

(51) Int. Cl.
*G08G 1/123* (2006.01)
*G01C 21/36* (2006.01)
*B60K 35/00* (2006.01)
*B60W 30/095* (2012.01)

(52) U.S. Cl.
CPC ............ *G01C 21/365* (2013.01); *B60K 35/00* (2013.01); *B60W 30/0956* (2013.01); *G01C 21/3658* (2013.01)

(58) Field of Classification Search
CPC ............. G01C 21/365; G01C 21/3658; B60W 50/0097; B60W 50/14; B60W 60/00; B60W 30/0956; B60K 2370/1529; B60K 35/00
USPC ....................................................... 340/995.1
See application file for complete search history.

(56) References Cited

U.S. PATENT DOCUMENTS

| | | |
|---|---|---|
| 2017/0054946 A1 | 2/2017 | Lee et al. |
| 2017/0210394 A1* | 7/2017 | Yamada ............... B60W 50/087 |
| 2017/0235135 A1 | 8/2017 | Ishiguro et al. |
| 2017/0336222 A1 | 11/2017 | Yamaguchi et al. |
| 2018/0023970 A1 | 1/2018 | Iguchi |
| 2018/0178839 A1 | 6/2018 | Ide |
| 2018/0299286 A1 | 10/2018 | Iguchi |
| 2018/0345790 A1 | 12/2018 | Mimura et al. |

(Continued)

FOREIGN PATENT DOCUMENTS

| | | |
|---|---|---|
| JP | H08178679 A | 7/1996 |
| JP | 2016145783 A | 8/2016 |

(Continued)

*Primary Examiner* — Tai T Nguyen
(74) *Attorney, Agent, or Firm* — Hunton Andrews Kurth LLP

(57) ABSTRACT

A vehicle display device includes a display control unit that is configured to: display markers in positions, on a display unit, corresponding to future positions of a host vehicle which are acquired from an autonomous driving control unit that autonomously drives the host vehicle, and move display positions of the markers on the display unit in accordance with travel of the host vehicle and toward a reference position on the display unit corresponding to the host vehicle.

14 Claims, 11 Drawing Sheets

(56) References Cited

U.S. PATENT DOCUMENTS

| | | | |
|---|---|---|---|
| 2019/0120646 A1 | 4/2019 | Iguchi | |
| 2019/0270458 A1 | 9/2019 | Shimotani et al. | |
| 2019/0295418 A1* | 9/2019 | Akamine | B60Q 9/008 |
| 2020/0309555 A1 | 10/2020 | Kumon | |
| 2020/0361482 A1 | 11/2020 | Choi et al. | |

FOREIGN PATENT DOCUMENTS

| | | |
|---|---|---|
| JP | 2017126287 A | 7/2017 |
| JP | 2017144889 A | 8/2017 |
| JP | 2017211370 A | 11/2017 |
| JP | 2018103862 A | 7/2018 |
| JP | 2018203008 A | 12/2018 |
| JP | 2019016366 A | 1/2019 |

\* cited by examiner

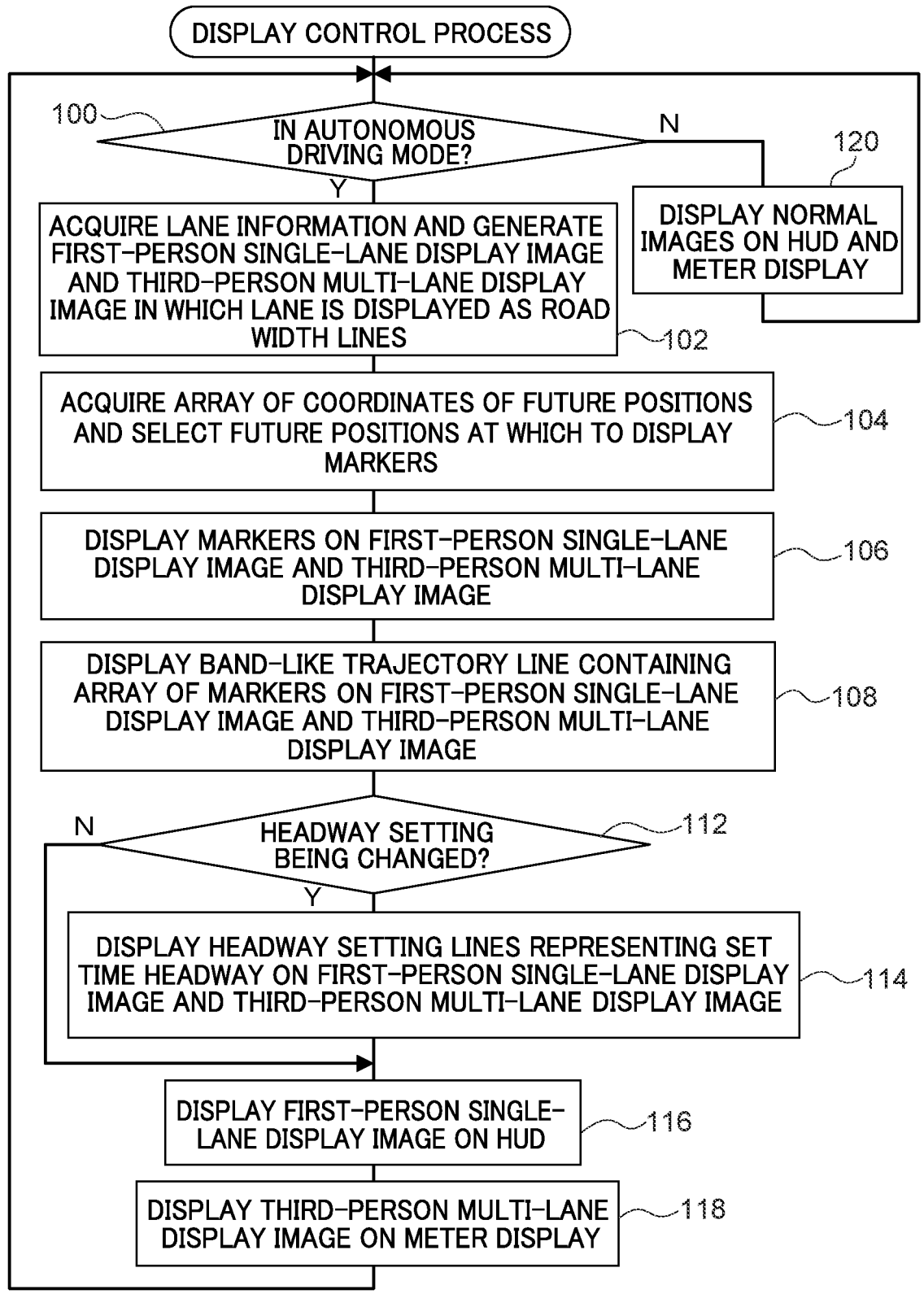

VEHICLE DISPLAY DEVICE

CROSS-REFERENCE TO RELATED APPLICATION

This is a continuation application of U.S. patent application Ser. No. 16/831,230, filed Mar. 26, 2020, which is based on and claims priority under 35 USC 119 from Japanese Patent Application No. 2019-064664 filed on Mar. 28, 2019, the disclosures of which are incorporated by reference herein.

BACKGROUND

Technical Field

The present disclosure relates to a vehicle display device.

Related Art

Japanese Patent Application Laid-open (JP-A) No. H08-178679 discloses a technology that detects the traveling state of a vehicle, calculates a future projected trajectory of the vehicle on the basis of the detected traveling state, and displays the projected trajectory on a head-up display device. In this technology, the projected trajectory is displayed as a bird's eye view in which a group of points are arrayed at predetermined intervals on a curve representing the projected trajectory of the center of gravity of the vehicle and in which boxes having substantially the same width as the width of the vehicle are arranged with the center of gravity being matched to each of the group of points.

The technology disclosed in JP-A No. H08-178679 presupposes displaying information on a superimposed (augmented reality, or AR) type head-up display that entirely covers the forward field of view of an occupant in the front seat of the vehicle, but the optical system for realizing such a large head-up display is extremely difficult to construct and at the present time is not realistic. On the other hand, if the technology disclosed in JP-A No. H08-178679 is applied to display information on a small display unit, such as a small head-up display whose display range is part of the forward field of view of the occupant or a display in an instrument panel, it would become difficult for the driver to intuitively grasp that the information being displayed on the display unit corresponds to the actual foreground the driver is seeing, so this technology has room for improvement.

SUMMARY

The present disclosure has been devised in consideration of the above circumstances and provides a vehicle display device which, even in the case of displaying information on a small display unit that does not widely cover the forward field of view of an occupant, allows the occupant to intuitively grasp that the display information corresponds to the actual foreground.

One aspect of the disclosure is a vehicle display device including a display control unit that is configured to display markers in positions, on a display unit, corresponding to future positions of a host vehicle which are acquired from an autonomous driving control unit that autonomously drives the host vehicle, and move display positions of the markers on the display unit in accordance with travel of the host vehicle and toward a reference position on the display unit corresponding to the host vehicle.

In the aspect, the display control unit moves the display positions, on the display unit, of the markers that is displayed in positions on the display unit corresponding to the future positions of the host vehicle, toward the reference position on the display unit corresponding to the host vehicle, in accordance with the travel of the host vehicle. Because of this, the display positions of the markers move as if synchronously with the travel of the host vehicle, so even in the case of displaying information on a small display unit that does not cover the forward field of view of the occupant, the display control unit allows the occupant to intuitively grasp that the display information corresponds to the actual foreground. Furthermore, the dynamic flow of the markers serves as an appropriate stimulant and helps the occupant maintain the motivation to continuously monitor the travel of the host vehicle.

In the aspect, the display control unit may be configured to move the display positions of the markers on the display unit toward the reference position on the display unit, by switching the future positions at which the markers are displayed so that time differences between the future positions and the current time become smaller as time elapses.

The moving of the display positions of the markers on the display unit toward the reference position on the display unit may be realized by switching the future positions at which the display control unit displays the markers so that the time differences of the future positions from the current time become smaller as time elapses as described above for example. Because of this, the display positions of the markers on the display unit may be moved by the simple process of switching the future positions at which the display control unit displays the markers.

In the aspect, the display control unit may be configured to display the markers in plural positions on the display unit corresponding to plural future positions of the host vehicle each having a time difference that differs from the current time by a predetermined amount of time.

In this configuration, the time differences, from the current time, of the plural future positions at which the display control unit displays the markers differ a predetermined amount of time each. Therefore, the display control unit allows the occupant to intuitively grasp, from the display intervals between the plural markers, changes in the behavior of the host vehicle in the time axis direction including acceleration and deceleration of the host vehicle.

In the aspect, the display control unit may be configured to display, on the display unit, a band-like trajectory line having a width direction that is aligned with a vehicle width direction of the host vehicle, having a length direction that is aligned with an array of the future positions of the host vehicle, and which contains the markers.

In this configuration, the display control unit displays the band-like trajectory line, and the trajectory line has its width direction aligned with the vehicle width direction of the host vehicle, has its length direction aligned with the array of future positions of the host vehicle, and contains the markers. Therefore, it allows the occupant to intuitively grasp, from the direction in which the trajectory line extends, the advancing position of the host vehicle.

In the aspect, the display control unit may be configured to display, on the display unit, road width lines that simulate boundary lines of a lane in which the host vehicle is traveling.

In this configuration, the display control unit displays the road width lines that simulate the boundary lines of the lane in which the host vehicle is traveling, so it allows the occupant to more intuitively grasp that the display information corresponds to the actual foreground.

In the aspect, the display control unit may be configured to, in a case in which a time headway setting for autonomous driving control of the host vehicle has been changed, display, on the display unit, headway setting lines according to a time headway that has been set.

In this configuration, in a case in which the time headway setting in the autonomous driving mode has been changed, the display control unit displays the headway setting lines according to the time headway that has been set, so the vehicle display device allows the occupant to grasp the time headway setting. The markers pertaining to this disclosure are indicators whose display positions on the display unit move, so confusion between the markers and the headway setting lines may be avoided.

In the aspect, the display unit may include a head-up display having a display range that is part of a forward field of view of an occupant of the host vehicle, a display provided in an instrument panel of the host vehicle, or a combination thereof.

In this configuration, the display unit is a small display that does not widely cover the forward field of view of the occupant, namely, a head-up display whose display range is part of the forward field of view of the occupant of the host vehicle or a display provided in the instrument panel of the host vehicle. Because of this, the vehicle display device may employ a configuration that is easy to implement as the display unit and allows the occupant to intuitively grasp that the information displayed on the display corresponds to the actual foreground.

Another aspect of the disclosure is a vehicle display control method including: displaying markers in positions, on a display unit, corresponding to future positions of a host vehicle acquired which are from an autonomous driving control unit that autonomously drives the host vehicle; and moving display positions of the markers on the display unit in accordance with travel of the host vehicle and toward a reference position on the display unit corresponding to the host vehicle.

Yet another aspect of the disclosure is a non-transitory storage medium storing a program that causes a computer to execute a vehicle display control process, the vehicle display control process including: displaying markers in positions, on a display unit, corresponding to future positions of a host vehicle which are acquired from an autonomous driving control unit that autonomously drives the host vehicle; and moving display positions of the markers on the display unit in accordance with travel of the host vehicle and toward a reference position on the display unit corresponding to the host vehicle.

The vehicle display device of this disclosure allows, even in the case of displaying information on a small display unit that does not widely cover the forward field of view of an occupant, the occupant to intuitively grasp that the display information corresponds to the actual foreground.

BRIEF DESCRIPTION OF THE DRAWINGS

FIG. 3 is a flowchart illustrating a display control process;

DETAILED DESCRIPTION

Figure 1:
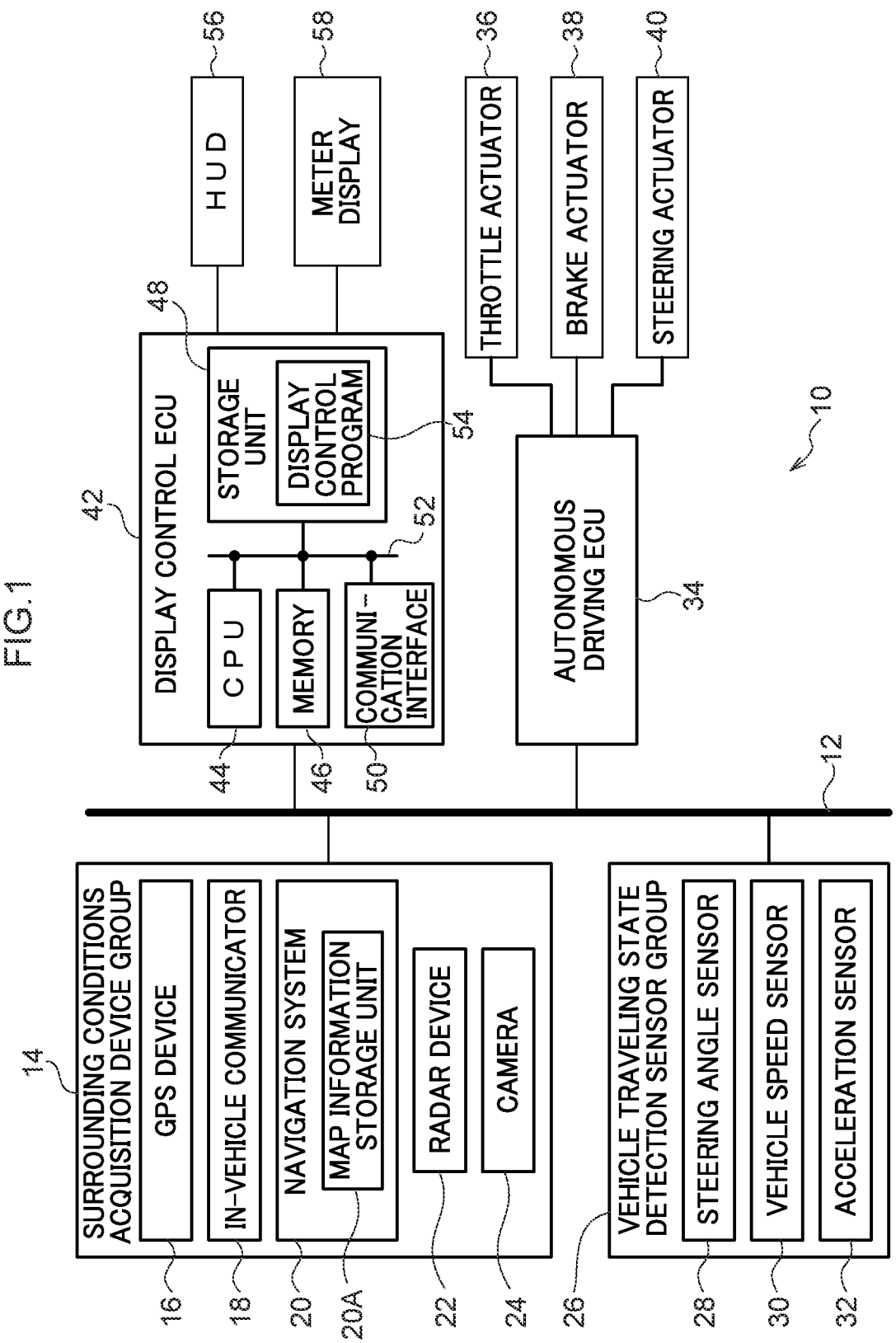
FIG. 1 is a block diagram illustrating the general configuration of an in-vehicle system pertaining to an exemplary embodiment.

An exemplary embodiment of the disclosure will be described in detail below with reference to the drawings. An in-vehicle system 10 illustrated in FIG. 1 is equipped with a communication bus 12, and connected to the communication bus 12 are a surrounding conditions acquisition device group 14, a vehicle traveling state detection sensor group 26, an autonomous driving electronic control unit (ECU) 34, and a display control ECU 42. It will be noted that FIG. 1 illustrates only part of the in-vehicle system 10. Furthermore, below, the vehicle in which the in-vehicle system 10 is installed is called the host vehicle.

The surrounding conditions acquisition device group 14 includes, as devices that acquire information about the conditions of the environment around the host vehicle, a global positioning system (GPS) device 16, an in-vehicle communicator 18, a navigation system 20, a radar device 22, and a camera 24.

The GPS device 16 receives GPS signals from plural GPS satellites to locate the position of the host vehicle. The positioning precision of the GPS device 16 becomes better as the number of receivable GPS signals increases. The in-vehicle communicator 18 is a communication device that performs at least one of vehicle-to-vehicle communication with other vehicles and vehicle-to-roadside communication with roadside units. The navigation system 20 includes a map information storage unit 20A that stores map information, and the navigation system 20 performs a process that displays the host vehicle's position on a map and provides directions to the host vehicle's destination on the basis of the position information obtained from the GPS device 16 and the map information stored in the map information storage unit 20A.

The radar device 22 includes plural radar devices with mutually different detection ranges, detects objects such as pedestrians and other vehicles in the area around the host vehicle as point group information, and acquires the positions and velocities of the detected objects relative to the host vehicle. Furthermore, the radar device 22 has a built-in processor that processes the detections results of the objects in the area around the host vehicle. The processor excludes, from its monitoring targets, noise and roadside objects such as guardrails on the basis of changes in the positions and velocities, relative to the host vehicle, of individual objects included in the most recent results of multiple detections, and tracks and monitors specific objects such as pedestrians and other vehicles as monitoring target objects. Additionally, the radar device 22 outputs information such as the positions and velocities of individual monitoring target objects relative to the host vehicle. The camera 24 captures, with plural cameras, images of the area around the host vehicle and outputs the images it has captured.

Furthermore, the vehicle traveling state detection sensor group 26 includes, as plural sensors that acquire information about the traveling state of the host vehicle, a steering angle sensor 28 that detects the steering angle of the host vehicle, a vehicle speed sensor 30 that detects the traveling speed of the host vehicle, and an acceleration sensor 32 that detects acceleration applied to the host vehicle.

Connected to the autonomous driving ECU 34 are a throttle actuator 36 that changes the throttle position of the host vehicle and a brake actuator 38 that changes the braking force generated by the braking system of the host vehicle. Also connected to the autonomous driving ECU 34 is a steering actuator 40 that changes the amount of steering by the steering system of the host vehicle.

The autonomous driving ECU 34 includes a central processing unit (CPU), a memory including a read-only memory (ROM) and a random-access memory (RAM), a nonvolatile storage unit such as a hard disk drive (HDD) or a solid state drive (SSD), and a communication interface. Autonomous driving software (program) is stored in the storage unit. When an autonomous driving mode is selected, the CPU executes the autonomous driving software (program), whereby the autonomous driving ECU 34 performs an autonomous driving process that allows the host vehicle to travel autonomously without driving input from the occupant of the host vehicle. The autonomous driving process is a process that judges the conditions of the host vehicle and its surroundings and controls the throttle actuator 36, the brake actuator 38, and the steering actuator 40 on the basis of the information obtained from the surrounding conditions acquisition device group 14 and the vehicle traveling state detection sensor group 26.

In the exemplary embodiment, the level of autonomous driving performed by the autonomous driving ECU 34 is Level 2 or Level 3. Level 2 or Level 3 autonomous driving requires the driver to monitor the autonomous driving by the autonomous driving ECU 34 and intervene as needed in anticipation of cases that fall outside the controllable scope of the autonomous driving ECU 34 or actions for which the autonomous driving ECU 34 is not fit due to sensor misdetection, non-detection, or failure.

The display control ECU 42 includes a CPU 44, a memory 46 including a ROM and a RAM, a nonvolatile storage unit 48 such as an HDD or an SSD, and a communication interface 50. The CPU 44, the memory 46, the storage unit 48, and the communication interface 50 are communicably connected to each other via an internal bus 52. A display control program 54 is stored in the storage unit 48. The display control ECU 42 executes a later-described display control process as a result of the display control program 54 being read out from the storage unit 48 and loaded to the memory 46, and then the display control program 54 that has been loaded to the memory 46 being executed by the CPU 44.

Figure 2:
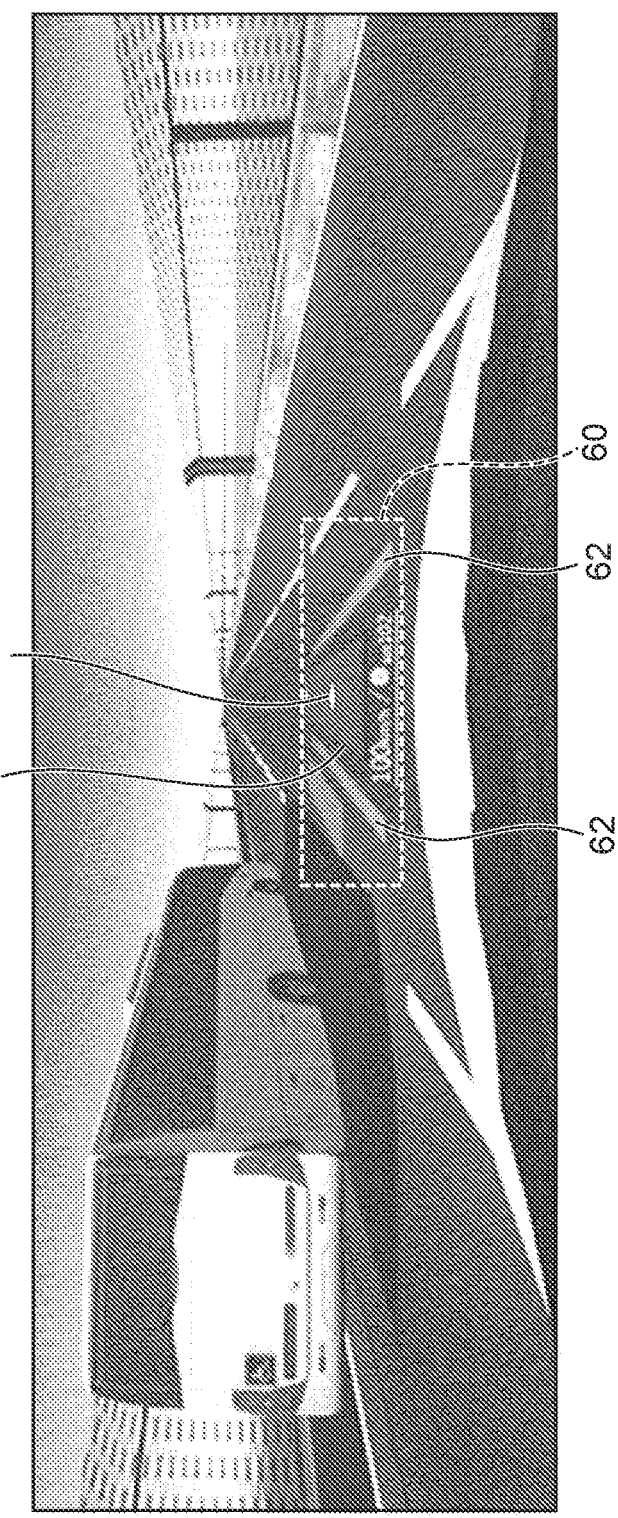
FIG. 2 is a drawing illustrating an example of the display range of a HUD.

Connected to the display control ECU 42 are a head-up display (hereinafter called the HUD) 56 and a meter display 58. The HUD 56 pertaining to the exemplary embodiment is a small HUD whose display range is part of the forward field of view of the occupant of the host vehicle (forms an image in the lower foreground) by reflection on the windshield glass, for example, as illustrated in FIG. 2 where reference sign 60 denotes the display range. Furthermore, the meter display 58 is a display provided in the instrument panel of the host vehicle. The display control ECU 42 controls the display of information on the HUD 56 and the meter display 58.

The autonomous driving ECU 34 is an example of an autonomous driving control unit, and the display control ECU 42 is an example of a display control unit. Furthermore, the HUD 56 and the meter display 58 are examples of a display unit.

Next, the operation of the present embodiment will be described. While the autonomous driving ECU 34 is performing autonomous driving, the driver needs to continuously pay attention to the behavior of the host vehicle and surrounding traffic conditions, continuously grasp the behavior of the host vehicle and surrounding traffic conditions, and remain alert and prepared to act when intervention is necessary. However, if the host vehicle conveys, moment by moment as is to the driver, the surrounding conditions captured by the sensors, the excessive conveyance of information would increase the burden on the driver and so would defeat the purpose of autonomous driving, which is to alleviate the burden of driving.

Furthermore, in cases in which the host vehicle detects a need of some sort and begins non-routine driving operations, such as a fork in or a merging of the lane, or a lane change, the host vehicle may alert the driver. However, in cases in which, for example, the host vehicle is unable to detect an obstacle that has suddenly appeared on the road and continues routine driving as is even though it should avoid the obstacle, the host vehicle may not alert the driver because it does not contemplate demanding the driver's attention in the first place.

In view of these problems, the display control ECU 42 performs the display control process illustrated in FIG. 3. In step 100 of the display control process, the display control ECU 42 determines whether or not autonomous driving is being performed by the autonomous driving ECU 34.

Figure 4A:
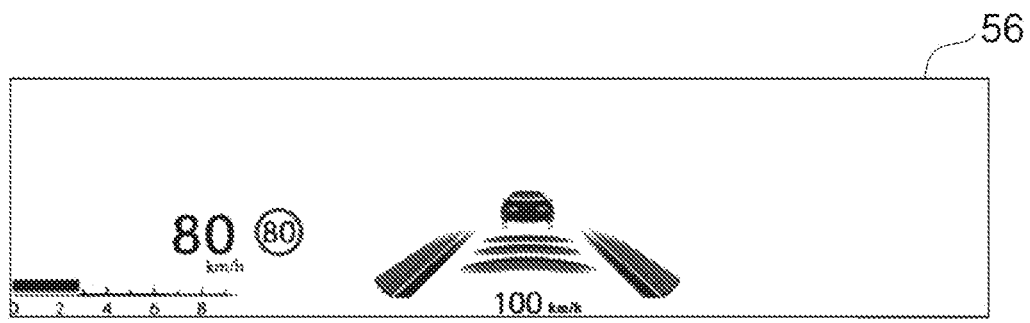
FIG. 4A and FIG. 4B are drawings illustrating examples of normal images displayed on the HUD and a meter display, respectively.
Figure 4B:
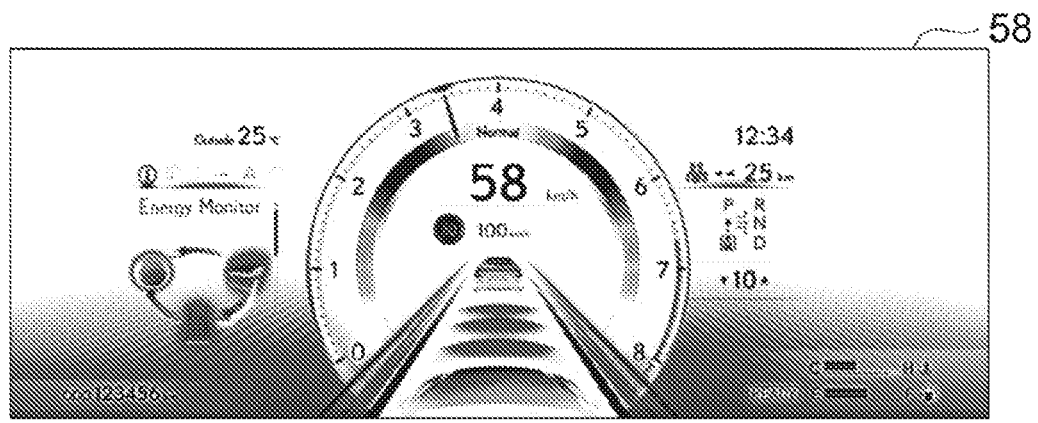

In a case in which the determination of step 100 is NO, the display control ECU 42 moves to step 120. In step 120, the display control ECU 42 displays normal images on the HUD 56 and the meter display 58. FIG. 4A illustrates an example of the normal image displayed on the HUD 56, and FIG. 4B illustrates an example of the normal image displayed on the meter display 58.

In a case in which autonomous driving is being performed by the autonomous driving ECU 34, the determination of step 100 is YES and the display control ECU 42 moves to step 102. In step 102, the display control ECU 42 acquires, from the autonomous driving ECU 34, information on the lanes being identified by the autonomous driving ECU 34.

Figure 5A:
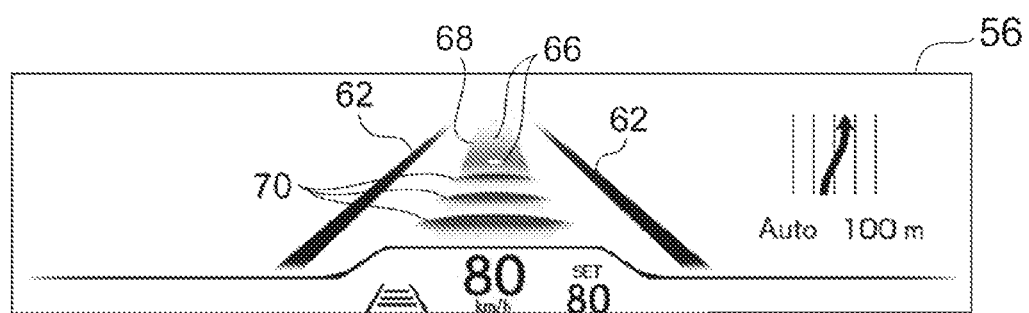
FIG. 5A is a drawing illustrating an example of a first-person single-lane display image displayed on the HUD.
Figure 5B:
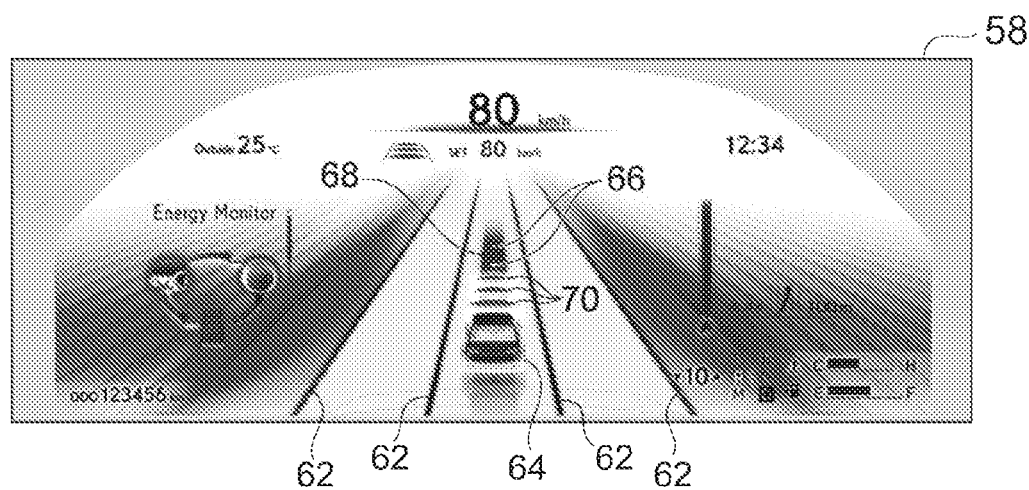
FIG. 5B is a drawing illustrating an example of a third-person multi-lane display image displayed on the meter display.

The lane information includes information relating to the host vehicle's lane in which the host vehicle is traveling (i.e., information such as whether the lane is straight or curved) and information relating to adjacent lanes adjacent to the right and left of the host vehicle's lane (i.e., information on whether or not there are adjacent lanes). Then, on the basis of the lane information acquired from the autonomous driving ECU 34, the display control ECU 42 generates, as images including road width lines 62 that simulates lane boundary lines, a first-person single-lane display image such as illustrated in FIG. 5A as an example and a third-person multi-lane display image such as illustrated in FIG. 5B as an example.

The first-person single-lane display image is an image close to what the driver sees in the forward direction through the windshield glass of the host vehicle, and lanes adjacent to the right and left of the host vehicle's lane are excluded from the display target. The first-person single-lane display image is an image in which the host vehicle's lane is displayed as large as possible and in which intrusiveness is minimized by not displaying information that is not important for monitoring travel. Various indicators described later are displayed large and conspicuously on the first-person single-lane display image.

The third-person multi-lane display image is an image in which the host vehicle is seen in a bird's eye view from above and behind and whose display targets are the host vehicle's lane and the lanes adjacent thereto on the right and left. Lanes that do not exist become excluded from the display targets, so in typical conditions there are a maximum of three lanes displayed in the third-person multi-lane display image. However, the third-person multi-lane display image is not limited to a maximum of three lanes for the ease of understanding transient states and the like accompanying forks and merges. In the third-person multi-lane display image, the host vehicle is displayed as an icon 64. The third-person multi-lane display image may display a situation in which, for example, there is another vehicle approaching and the host vehicle defers changing lanes, as in a situation in which the host vehicle is about to change lanes but there is another vehicle approaching from the rear right or the rear left and so the host vehicle defers changing lanes until the other vehicle passes and then the host vehicle changes lanes.

Figure 6:
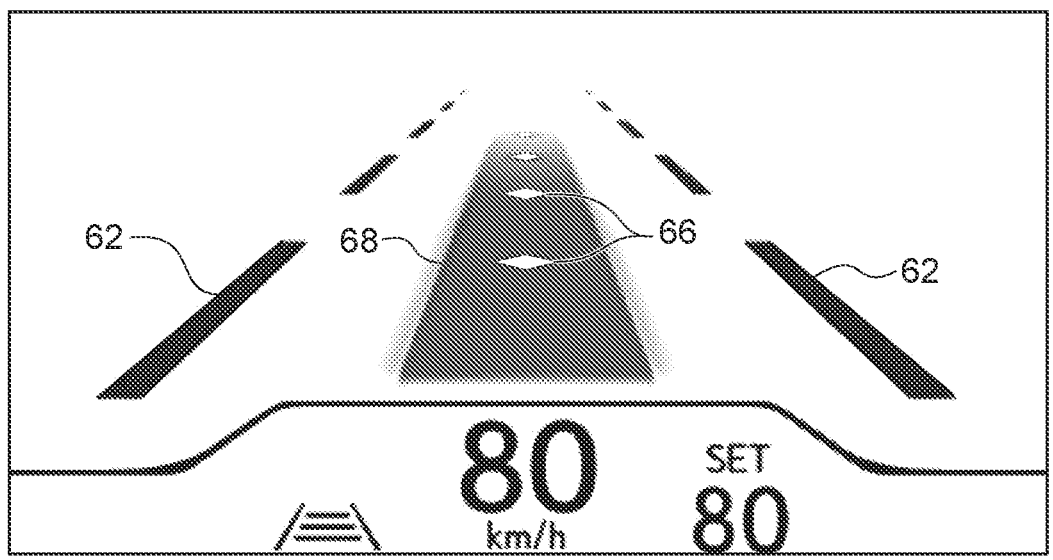
FIG. 6 is a drawing illustrating an example of the first-person single-lane display image displayed on the HUD when traveling on a straight road.
Figure 7:
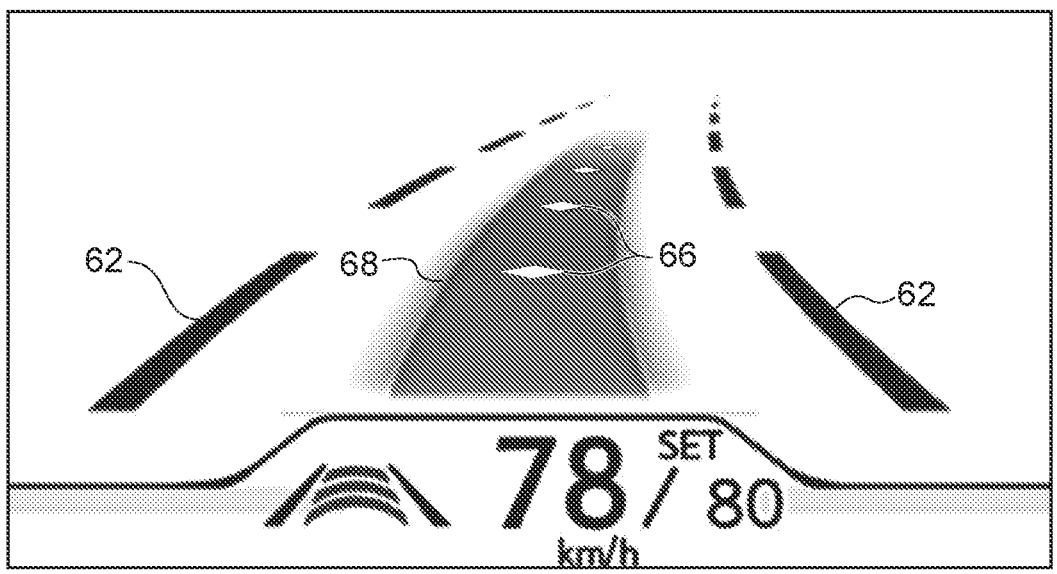
FIG. 7 is a drawing illustrating an example of the first-person single-lane display image displayed on the HUD when coming to a curve in the road.
Figure 8:
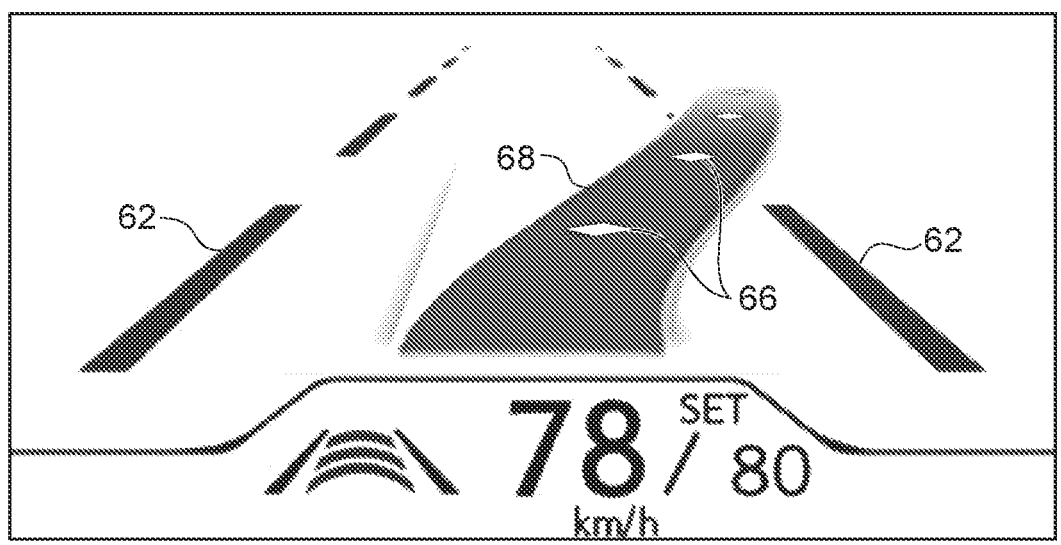
FIG. 8 is a drawing illustrating an example of the first-person single-lane display image displayed on the HUD when the host vehicle changes lanes.
Figure 9:
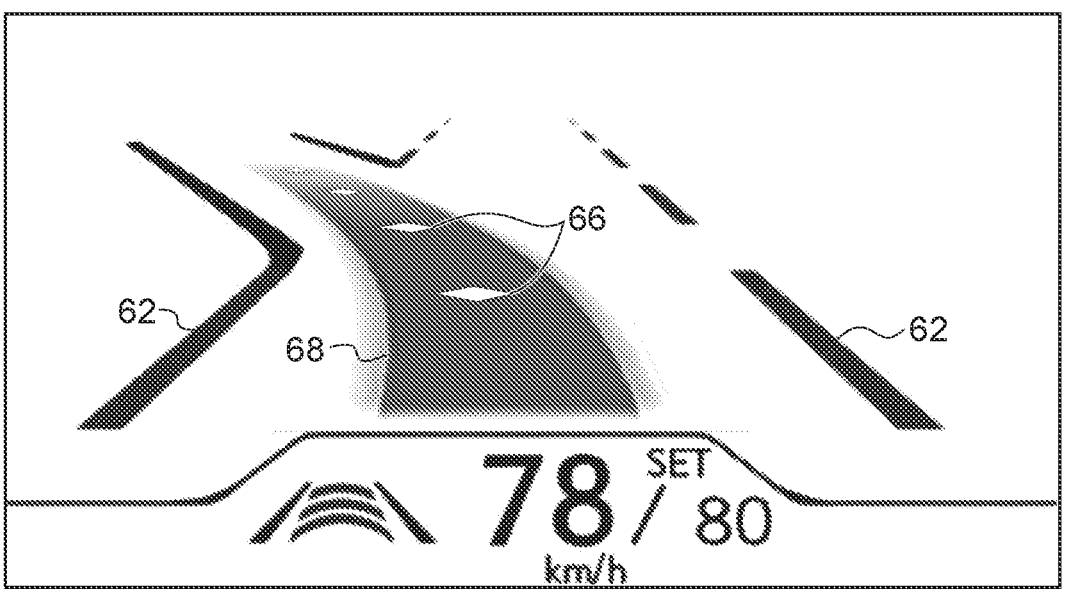
FIG. 9 is a drawing illustrating an example of the first-person single-lane display image displayed on the HUD when coming to a fork in the road.

In the first-person single-lane display image and the third-person multi-lane display image, the road width lines 62 that simulates lane boundary lines are displayed, so, for example, when the host vehicle comes to a curve in the road on which it is traveling, the road width lines 62 change from the display illustrated in FIG. 6 to the display illustrated in FIG. 7, and when the host vehicle comes to a fork in the road on which it is traveling, the road width lines 62 change from the display illustrated in FIG. 6 to the display illustrated in FIG. 9. This allows the driver to understand that the first-person single-lane display image and the third-person multi-lane display image are road diagrams having a contrasting relationship of similarity reduction with the actual scene (i.e., a perspective representation of the lane boundary lines). Furthermore, when the host vehicle is about to change lanes, as illustrated in FIG. 8, markers 66 and a trajectory line 68 described later change while the road width lines 62 remain unchanged, whereby the driver understands that the host vehicle is about to change lanes.

Figure 10:
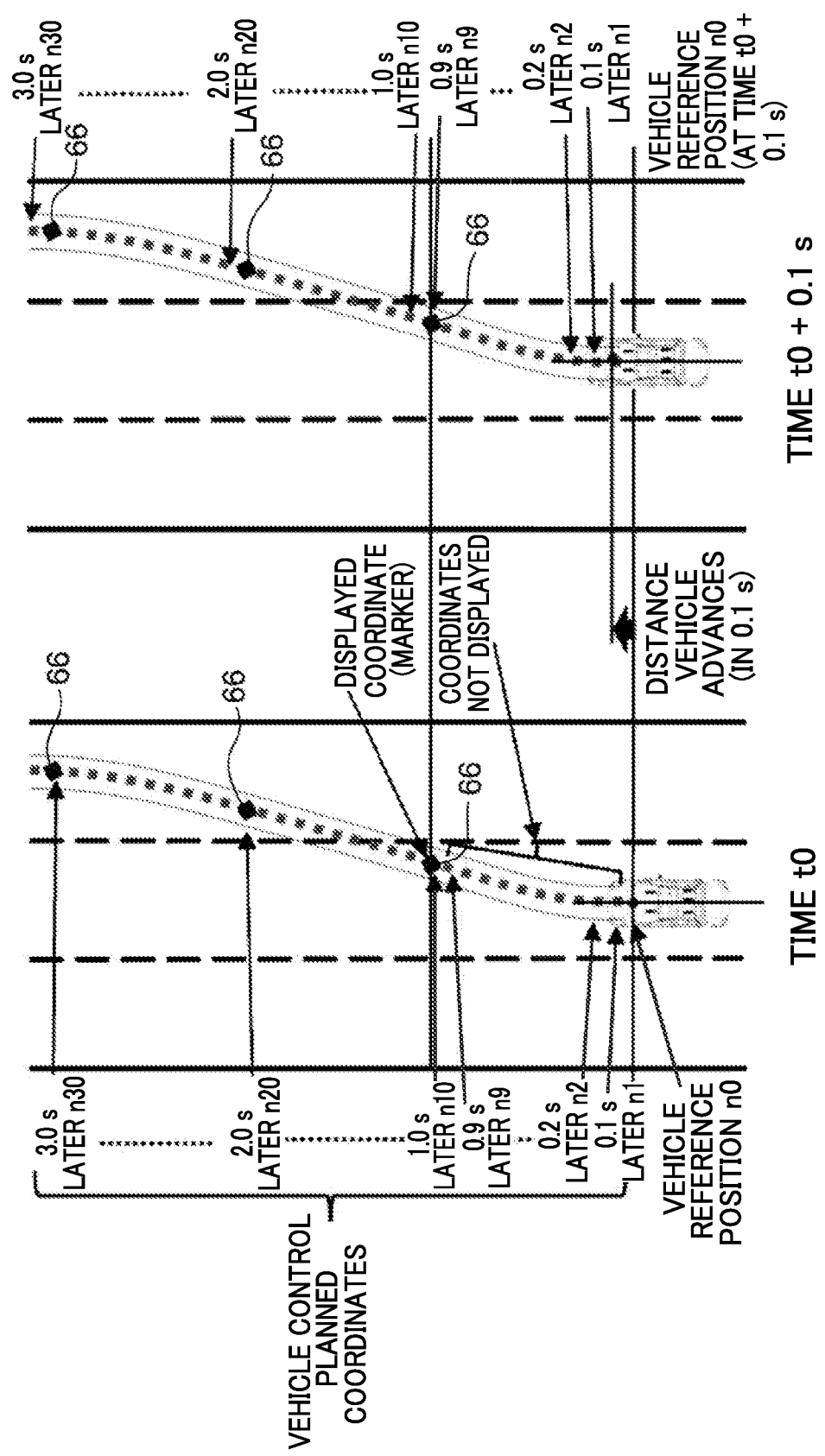
FIG. 10 is a conceptual drawing for describing a process of selecting future positions at which to display markers.

In step 104, the display control ECU 42 acquires an array of coordinates of future positions of the host vehicle from the autonomous driving ECU 34 and selects future positions at which to display markers 66 (see FIG. 5, etc.). As an example, a case will be described in which communication is performed every 100 milliseconds between the display control ECU 42 and the autonomous driving ECU 34 and in which, with each communication, as illustrated in FIG. 10, an array of coordinates of future positions of the host vehicle with a finite number in 100 millisecond-increments (e.g., 50 coordinates=5 seconds later) is transmitted from the autonomous driving ECU 34 to the display control ECU 42.

At time t0, the display control ECU 42 selects the current position of the host vehicle as an origin n0, selects the nine coordinates n1 to n9 from the front as future positions at which to not display a marker 66, and selects the tenth coordinate n10 as a future position at which to display a marker 66. In the same way, the display control ECU 42 selects coordinates n11 to n19 as future positions at which to not display a marker 66 and selects coordinate n20 as a future position at which to display a marker 66. Because of this, an array of markers 66 at 1-second intervals with respect to the array of coordinates of future positions received from the autonomous driving ECU 34 is generated.

Furthermore, at time t1 100 milliseconds later, the host vehicle generally moves to the position of coordinate n1 that was received at time t0, and the display control ECU 42 generates an array of new markers 66 using as a reference the new position of the host vehicle. At that time, the display control ECU 42 keeps the display/hide attributes in regard to each of the coordinates that were received at time t0, so that the display control ECU 42 selects coordinates n1 to n8 as future positions at which to hide or not display a marker 66, selects coordinate n9 as a future position at which to display a marker 66, selects coordinates n10 to n18 as future positions at which to not display a marker 66, and selects coordinate n19 as a future position at which to display a marker 66. In other words, the display control unit 42 switches the future positions at which it displays the markers 66 so that time differences, from the current time, of the future positions at which it displays the markers 66 become smaller as time elapses (e.g., time t0→time t1). As a result, at time t1 an array of markers 66 whose phases have moved 100 milliseconds' worth toward the host vehicle compared to time t0 is generated.

In step 106, the display control ECU 42, based on the results of having selected future positions at which to display the markers 66 in step 104, converts the coordinates of the future positions at which to display the markers 66 to coordinates on the first-person single-lane display image illustrated in FIG. 5A and displays the markers 66 on the converted coordinates on the first-person single-lane display image. Furthermore, the display control ECU 42 converts the coordinates of the future positions at which to display the markers 66 to coordinates on the third-person multi-lane display image illustrated in FIG. 5B and displays the markers 66 on the converted coordinates on the third-person multi-lane display image.

Through the processes of steps 104 and 106, on the first-person single-lane display image and the third-person multi-lane display image the markers 66 are displayed in positions corresponding to the future positions of the host vehicle and the array of markers 66 advances forward (i.e., moves downward on the displays) in accordance with the travel of the host vehicle and toward the reference position corresponding to the host vehicle. This results in a display in which the array of markers 66 placed on the road every fixed amount of time (e.g., every 1 second) flows along. Because of this, the driver is allowed to intuitively grasp that the first-person single-lane display image and the third-person multi-lane display image correspond to the actual foreground.

In periods in which the display control ECU 42 is not communicating with the autonomous driving ECU 34 (e.g., the period between time t0 and time t1), it is desired that the display control ECU 42 calculate the display positions of the markers 66 by extrapolation, for example, and display the markers 66. This results in a continuous motion in which the markers 66 are animated, enabling in a higher-quality, smoother display.

In step 108, the display control ECU 42 displays on the first-person single-lane display image and the third-person multi-lane display image a band-like trajectory line 68 whose width direction is aligned with the vehicle width direction of the host vehicle, whose length direction is aligned with the array of future positions of the host vehicle, and which contains the array of markers 66 (see FIG. 5A and FIG. 5B). In the first-person single-lane display image and the third-person multi-lane display image, the direction in which the band-like trajectory line 68 extends represents the direction in which the host vehicle advances, which allows the driver to intuitively grasp the advancing position of the host vehicle.

Furthermore, the band-like trajectory line 68 that extends in the direction in which the host vehicle advances is understood by the driver as a representation that resembles rails laid on top of the road, and the markers 66 placed every fixed amount of time are understood by the driver as representations that resemble ties on a railroad track. In this way, the representation formed by the markers 66 and the trajectory line 68 forms a mental model with a sense of familiarity to many people, so it allows the driver to intuitively recognize that it is an advance display of future times to which the host vehicle will travel from now.

In step 112, the display control ECU 42 determines whether or not a headway (inter-vehicle) setting with respect to autonomous driving is being changed. If the headway setting is being changed, the determination of step 112 is YES and the display control ECU 42 moves to step 114. In step 114, the display control ECU 42 displays, on the first-person single-lane display image and the third-person multi-lane display image, headway setting lines 70 representing the set time headway (the number of the headway setting lines 70 changes in accordance with the set time headway) (see FIG. 5A and FIG. 5B).

In this way, when the display control ECU 42 displays the headway setting lines 70, it may allow the driver to grasp the set time headway. Furthermore, in the exemplary embodiment, the headway setting lines 70 are stationary on the first-person single-lane display image and the third-person multi-lane display image. In contrast, the markers 66 are markers whose display positions move as the host vehicle travels, so confusion between the markers 66 and the headway setting lines 70 may be avoided.

In a case in which the headway setting is not being changed, the determination of step 112 is NO and step 114 is skipped. In this case, the headway setting lines 70 are not displayed on the first-person single-lane display image and the third-person multi-lane display image.

In step 116, the display control ECU 42 displays the first-person single-lane display image on the HUD 56 as illustrated in FIG. 5A. In displaying the image on the HUD 56, the display control ECU 42 performs a process that changes the display position of the image on the HUD 56 in accordance with the steering angle of the steering system.

Figure 11:
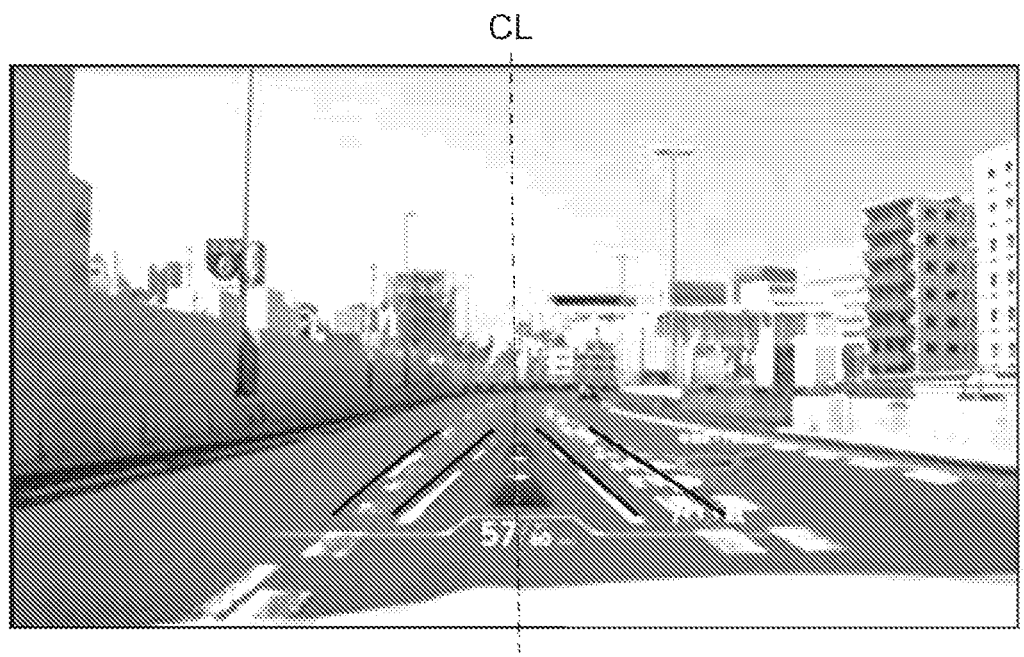
FIG. 11 is a drawing for describing a process of changing the display position of the image on the HUD in accordance with the steering angle of the steering system.

Namely, first, the display control ECU 42 acquires the steering angle of the steering system detected by the steering angle sensor 28. Then, if the steering angle of the steering system is 0, the display control ECU 42 displays the first-person single-lane display image on the HUD 56 so that, as illustrated in FIG. 11 as an example, the image center of the first-person single-lane display image displayed on the HUD 56 coincides with a center CL of the display range of the HUD 56.

Figure 12:
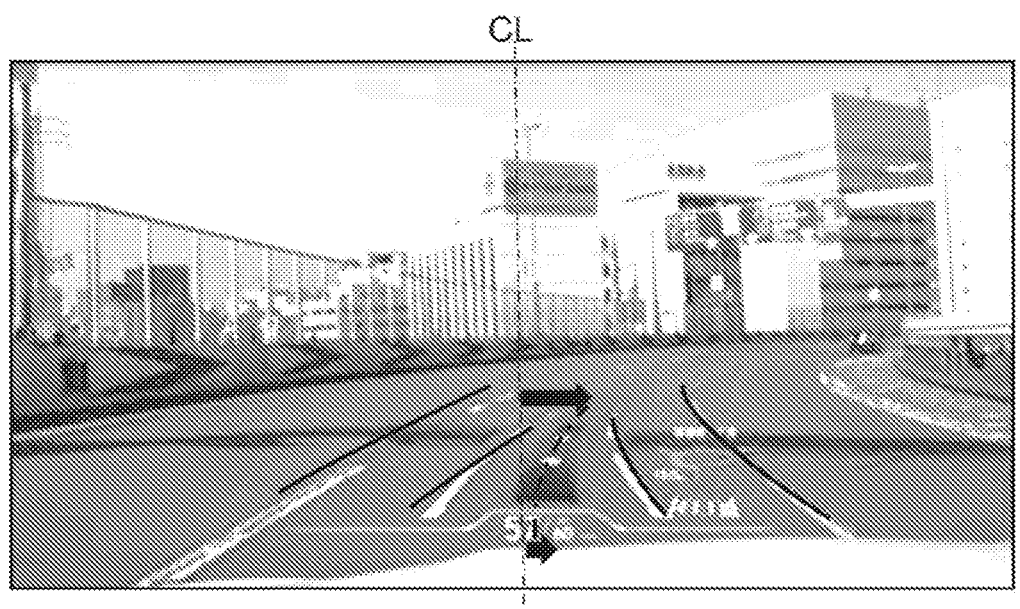
FIG. 12 is a drawing for describing the process of changing the display position of the image on the HUD in accordance with the steering angle of the steering system.

However, in a case in which the steering angle of the steering system is not 0, the display control ECU 42 displays the first-person single-lane display image on the HUD 56 so that, as illustrated in FIG. 12 as an example, the image center of the first-person single-lane display image displayed on the HUD 56 is offset a predetermined offset amount according to the steering angle amount in the steering direction (rightward or leftward) with respect to the center CL of the display range of the HUD 56.

As an example, FIG. 12 illustrates the image center of the first-person single-lane display image being offset in the rightward direction with respect to the center CL of the display range of the HUD 56. This allows the occupant to always feel that the host vehicle is in an appropriate position in the lane, without the image displayed on the HUD 56 shifting to the outside of the corner, in a case in which the road on which the host vehicle is traveling curves.

In the next step 118, the display control ECU 42 displays the third-person multi-lane display image on the meter display 58 as illustrated also in FIG. 5B. When the display control ECU 42 performs the process of step 118, it returns to step 100 and repeats step 102 to step 118 while the determination of step 100 is YES.

Figure 13:
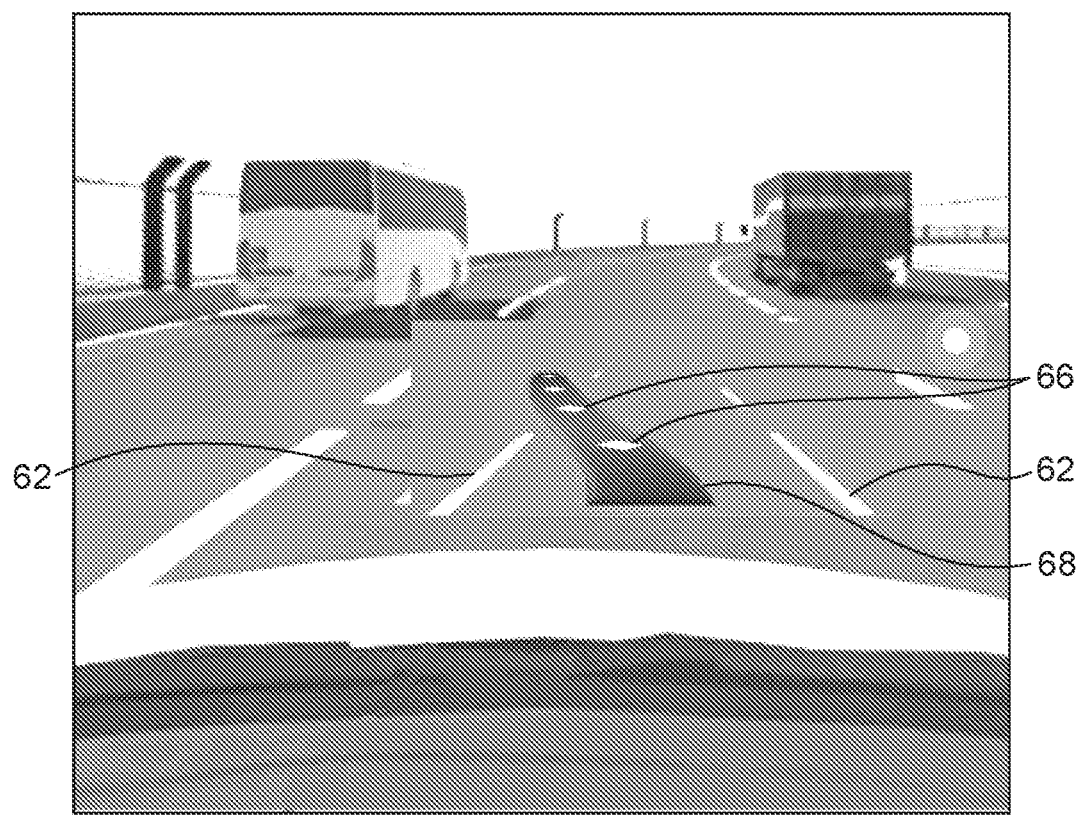
FIG. 13 is a drawing illustrating an example of a situation requiring driver intervention during autonomous driving.

In Level 2 or Level 3 autonomous driving, situations requiring the intervention of the driver may arise. As an example, FIG. 13 illustrates a situation in which the host vehicle is about to change lanes to the left lane adjacent to the left side of the host vehicle's lane despite the fact that there is a bus traveling in the left lane (i.e., a situation in which the host vehicle is not recognizing that the bus poses a danger to changing lanes). Here, it is desired that the driver intervene to abort the lane change. Even in a case such as this, the display control ECU 42 displays the markers 66, the trajectory line 68, and the road width lines 62 on the HUD 56 so that it may promptly make the driver aware that the host vehicle is about to change lanes to the left lane. Then, the driver may recognize that the bus poses a danger to changing lanes and may intervene to abort the lane change, without the host vehicle issuing a special alert.

Figure 14:
FIG. 14 is a drawing illustrating another example of a situation requiring driver intervention during autonomous driving.

Furthermore, as an example, FIG. 14 illustrates a situation in which the host vehicle is about to proceed straight despite the fact that the host vehicle's lane is blocked ahead by a lane closure (i.e., a situation in which the host vehicle does not recognize that the host vehicle's lane is blocked ahead). Here, it is desired that the driver intervene to change lanes. Even in a case such as this, the display control ECU 42 displays the markers 66, the trajectory line 68, and the road width lines 62 on the HUD 56 so that it may promptly make the driver away that the host vehicle is about to proceed straight. Then, the driver may recognize that the host vehicle's lane in which the host vehicle is about to proceed straight is blocked ahead and may intervene to change lanes, without the host vehicle issuing a special alert.

As described above, in the exemplary embodiment, the display control ECU 42 displays the markers 66 in positions on the HUD 56 and the meter display 58 corresponding to the future positions of the host vehicle acquired from the autonomous driving ECU 34 that autonomously drives the host vehicle, and the display control ECU 42 moves the display positions of the markers 66 on the HUD 56 and the meter display 58 in accordance with the travel of the host vehicle and toward the reference position on the HUD 56 and the meter display 58 corresponding to the host vehicle. Because of this, the display positions of the markers 66 move as if synchronously with the travel of the host vehicle, so even in the case of displaying information on the small HUD 56, which does not widely cover the forward field of view of the occupant, and the meter display 58, the display control ECU 42 allows the driver to intuitively grasp that the display information corresponds to the actual foreground.

Furthermore, in the exemplary embodiment, the display control ECU 42 moves the display positions of the markers 66 on the HUD 56 and on the meter display 58 toward the reference position on the HUD 56 and the meter display 58 by switching the future positions of the host vehicle at which it displays the markers 66 so that the time differences of the future positions of the host vehicle from the current time become smaller as time elapses. Because of this, the display positions of the markers 66 on the HUD 56 and the meter display 58 may be moved by the simple process of switching the future positions at which the display control ECU 42 displays the markers 66.

Furthermore, in the exemplary embodiment, the display control ECU 42 displays the markers 66 in plural positions on the HUD 56 and the meter display 58 corresponding to plural future positions of the host vehicle whose time differences from the current time differ a predetermined amount of time each. This allows the driver to intuitively grasp, from the display intervals between the plural markers 66, changes in the behavior of the host vehicle in the time axis direction including acceleration and deceleration of the vehicle.

Furthermore, in the exemplary embodiment, the display control ECU 42 displays on the HUD 56 and the meter display 58 the band-like trajectory line 68 whose width direction is aligned with the vehicle width direction of the host vehicle, whose length direction is aligned with the array of future positions of the host vehicle, and which contains the array of markers 66. This allows the driver to intuitively grasp, from the direction in which the trajectory line 68 extends, the advancing position of the host vehicle.

Furthermore, in the exemplary embodiment, the display control ECU 42 displays on the HUD 56 and the meter display 58 the road width lines 62 that simulate the boundary lines of the lane in which the host vehicle is traveling. This allows the driver to more intuitively grasp that the display information corresponds to the actual foreground.

Furthermore, in the exemplary embodiment, in a case in which the time headway has been changed, the display control ECU 42 displays on the HUD 56 and the meter display 58 the headway setting lines 70 according to the time headway that has been set, so the driver may grasp the time headway.

Although in the exemplary embodiment the markers 66 are configured to have the shape of a rhomboid, the markers 66 are not limited to this and may also be configured to have another shape, such as a circular shape or an elliptical shape.

Furthermore, although in the above description the autonomous driving ECU 34 is configured to perform Level 2 or Level 3 autonomous driving, the disclosure is not limited to this and may also be applied to a configuration that performs Level 4 or Level 5 autonomous driving. Driver intervention is unnecessary in Level 4 and higher autonomous driving, but by performing the display pertaining to this disclosure, the occupant of the vehicle is allowed to intuitively grasp that autonomous driving is functioning normally and be given a sense of security.

Furthermore, although in the above description the display control ECU 42 is configured to perform the display pertaining to the disclosure (display such as the markers 66, the trajectory line 68, and the road width lines 62) with respect to each of the HUD 56 and the meter display 58, the display control ECU 42 is not limited to this and may also be configured to perform the display pertaining to the disclosure with respect to either one of the HUD 56 and the meter display 58 and perform normal display (e.g., the display in FIG. 4A or FIG. 4B) with respect to the other display.

The display control program 54 of this disclosure may also be stored in an external server and loaded to the memory via a network. Furthermore, the display control program 54 may also be stored in a non-transitory storage medium such as a digital versatile disk (DVD) and loaded to the memory via a storage medium reading device.

What is claimed is:

1. A vehicle display device comprising:
a storage unit having a display control program stored thereon;
a memory having the display control program loaded thereon; and
a central processing unit (CPU) that is coupled to the memory to execute the display control program to:
acquire coordinates corresponding to future positions of a host vehicle from an autonomous driving control unit that autonomously drives the host vehicle,
generate an array of markers;
display the array of markers in positions, on a first display unit, corresponding to the future positions of the host vehicle based on the acquired coordinates, and
display a band-like trajectory line on the first display unit, the band-like trajectory line containing the array of markers.

2. The vehicle display device according to claim 1, wherein the CPU executes the display control program to move display positions of the array of markers on the first display unit in accordance with travel of the host vehicle and toward a reference position on the first display unit corresponding to the host vehicle.

3. The vehicle display device according to claim 1, wherein the CPU executes the display control program to select a coordinate corresponding to a future position to be displayed on the first display unit from the acquired coordinates.

4. The vehicle display device according to claim 3, wherein the CPU executes the display control program to convert the selected coordinate into a coordinate on the first display unit.

5. The vehicle display device according to claim 1, wherein the CPU executes the display control program to display, on the first display unit, an image in which a first-person perspective image and the markers are combined, the first-person perspective image being an image expressing a perspective of a driver of the host vehicle.

6. The vehicle display device according to claim 1, wherein the first display unit comprises a head-up display having a display range that is part of a forward field of view of an occupant of the host vehicle.

7. The vehicle display device according to claim 1, wherein the CPU executes the display control program to display, on a second display unit that is separate from the first display unit, an image in which a third-person perspective image and the array of markers are combined, the third-person perspective image being an image expressing a perspective of a bird's eye view seen from above and behind the host vehicle.

8. The vehicle display device according to claim 7, wherein the second display unit comprises a display provided in an instrument panel of the host vehicle.

9. The vehicle display device according to claim 1, wherein the CPU executes the display control program to display, on the first display unit, road width lines that simulate boundary lines of a lane in which the host vehicle is traveling.

10. The vehicle display device according to claim 1, wherein the CPU executes the display control program to, in a case in which a time headway setting for autonomous driving control of the host vehicle has been changed, display, on the first display unit, headway setting lines according to a time headway that has been set.

11. The vehicle display device according to claim 10, wherein the CPU executes the display control program to display the headway setting lines stationary on a display screen of the first display unit.

12. The vehicle display device according to claim 10, wherein the CPU executes the display control program not to display the headway setting lines stationary on the first display unit in a case in which the time headway setting for autonomous driving control of the host vehicle is not changed.

13. A vehicle display control method comprising:
acquiring coordinates corresponding to future positions of a host vehicle from an autonomous driving control unit that autonomously drives the host vehicle;
generating an array of markers;
displaying the array of markers in positions, on a first display unit, corresponding to the future positions of the host vehicle based on the acquired coordinates; and
displaying a band-like trajectory line on the first display unit, the band-like trajectory line containing the array of markers.

14. A non-transitory storage medium storing a program that causes a computer to execute a vehicle display control process, the vehicle display control process comprising:
acquiring coordinates corresponding to future positions of a host vehicle from an autonomous driving control unit that autonomously drives the host vehicle;
generating an array of markers;
displaying the array of markers in positions, on a first display unit, corresponding to the future positions of the host vehicle based on the acquired coordinates; and
displaying a band-like trajectory line on the first display unit, the band-like trajectory line containing the array of markers.

* * * * *